United States Patent Office 2,916,383
Patented Dec. 8, 1959

2,916,383

LOW CALORIC FRENCH DRESSING

Leo Serge Nasarevich, Jackson Heights, and Joseph George Spitzer, Mamaroneck, N.Y., assignors, by direct and mesne assignments, to Carter Products, Inc., New York, N.Y., a corporation of Maryland No Drawing. Application September 18, 1957
Serial No. 684,650

2 Claims. (Cl. 99—144)

This invention relates to a low caloric salad dressing and to a method of making the same. More particularly, it pertains to a dressing of the character described which simulates the well-known "French"-type dressing.

In the production of low caloric foods for people who have to or wish to keep their weight down or for various other reasons are on low calorie diets, probably the most difficult problem, outside of providing foods which satisfy hunger and are nourishing although having a low calorie content, is to provide an appetizing foodstuff which desirably tastes like the food being simulated. The problem is particularly difficult to solve with delicacies, among which many people would classify salads. To many people, salads are the most important and desirable course of a meal. Indeed, salads because of their low calorie content constitute one of the few ordinary types of food which are almost universally recommended for people who are on low calorie diets. Although salad dressings are what impart distinctiveness to a special salad and add life to an ordinary salad, dieting people are denied the pleasures of a good salad dressing because dressings are conventionally very high in caloric content. One of the salad dressings subject to this drawback is "French" dressing. Although, of course, all French dressings do not taste exactly alike, they have a characteristic taste, consistency, texture, appearance and smell. And although the specific taste is controlled by the particular combinations of ingredients, the basic carrier in French dressing is always a salad oil, usually winterized cottonseed oil, which is present in large quantities and which has a very high caloric content.

Attempts have been made from time to time to produce low calorie dressings simulating French dressing; the results of such attempts have been unfavorable and the products rejected by the public because they lacked most of the aforementioned physical characteristics of French dressing. Moreover, some of the substitutes did not have a long shelf life, i.e., they deteriorated when kept for substantial lengths of time, or lost whatever characteristics of the true product they had.

Generally, the problem of producing a low calorie French dressing has defied solution because of the inability to produce a dressing which would have the physical characteristics of French dressing attributable to the presence of oil without actually using large quantities of oil. And, in addition, the problem is complicated by the necessity of producing the aforementioned characteristics without interfering with development of a certain established taste.

It is an object of the present invention to provide a salad dressing having a very low calorie content which, nevertheless, simulates ordinary French dressing in taste, smell, consistency, texture, color and other physical characteristics.

It is another object of the present invention to provide a salad dressing of the character described which can be varied to specific tastes as is the case with ordinary French dressing.

It is another object of the present invention to provide a salad dressing of the character described which is long-lasting and not subject to any special drawbacks as a food and which does not require special handling or treatment to retain its qualities.

It is another object of the present invention to provide a method for producing a dressing of the character described.

It is another object of the present invention to provide a method of the character described which is economical and simple to practice.

Other objects of the present invention in part will be obvious and in part will be pointed out hereinafter.

The invention accordingly consists in the combination of compositions and series of steps which will be exemplified in the compositions and process hereinafter described and of which the scope of application will be indicated in the appended claims.

Ordinary French dressings include an oil carrier usually constituting a predominant amount, e.g., almost one-half, by weight of the dressing. In addition, such dressings include vinegar, tomato paste, water, salt, sugar and various spices such as mustard, onion powder, garlic powder, black pepper and others. The relative amounts of spices and other ingredients create the characteristic taste and smell of this dressing and can, of course, be varied to different tastes. The oil, however, gives the dressing its traditional oily texture and consistency whereby, among other things, it clings to the salad ingredients and produces a particular effect on the palate. In a typical conventional French dressing, water is present in an amount less that 5% by weight exclusive of vinegar, about one-third of the dressing is vinegar of 5% acidity, about 2% is tomato paste, about 10% is sugar, some salt is present, and the carrier is winterized cottonseed oil which constitutes almost 50% of the dressing by weight. In addition, small amounts of various spices are present. The method of manufacture is quite simple. Water, vinegar, tomato paste, spices, salt and sugar are mixed together as by agitation. Oil next is added slowly followed by rapid agitation. The mixture is homogenized by pumping the same through a standard homogenizer.

Pursuant to the present invention, the use of oil as a carrier for French dressing is obviated by employing a carrier comprising water and a special combination of singular ingredients which, when blended together and with the other ingredients in accordance with the method of the instant invention, impart the proper texture and consistency to the dressing and give it the characteristic oiliness of French dressing. Accordingly, no oil at all is employed with the result that the dressing has 98.00% less caloric content than ordinary French dressing. This amounts to less than 1 calorie per tablespoonful as opposed to over the 50 calories per tablespoonful for ordinary French dressing. About 90% of the calorie content of ordinary French dressing is contributed by the oil and all of this has been eliminated pursuant to the invention.

To carry out the objects of the invention, four special ingredients are employed in critical proportions to create the traditional physical characteristics of French dressing, especially the oleaginous character thereof.

The first of the special ingredients is a gum selected from a particular class of gums which, pursuant to the invention it has been found, creates a thickening effect and additionally is a predominant factor in securing an oily characteristic in the finished product. This group of gums consists of gum tragacanth, gum karaya, methyl cellulose, propylene glycol sodium alginate and karaghinates. Preferably, gum tragacanth is employed. The range in which it is used is highly critical, varying from 1.2 to 1.5% of the dressing by weight, the preferable amount being 1.3% of the dressing by weight. The percentage is higher during the summertime. The seasonal variation is caused by thinning of the gum in hot weather, salad dressing being a foodstuff which is not ordinarily kept under refrigeration. Less than 1.2% of this gum produces a dressing which is too thin and breaks down, i.e., separates, while more than 1.5% makes the product unpalatable and too thick. All of the aforementioned group of gums are usable in the range set forth above.

Another very important ingredient of the carrier is a gum employed to smooth the texture, prolong shelf life and prevent separation. For this purpose, agar or derivatives thereof are employed. Said gum is used in the critical range of 0.2 to 0.35% by weight, a preferable amount being 0.2%. Less than 0.2% makes the gum ineffective while more than 0.35% produces lumpiness. Since shelf life and smoothness are essential to the dressing, the importance of this ingredient can readily be appreciated.

The third essential ingredient is pectin or derivatives thereof which are employed to add smoothness to the dressing. This ingredient strengthens the structure of the mixture because it reacts with the tomato paste solids (referred to hereinafter) in the acid medium of the product. The range for this ingredient is critical and is 0.2 to 0.5% by weight, 0.2% being the preferred amount.

The fourth essential ingredient is kaolin, the amount thereof being 1% by weight. The function of this ingredient is to create body without adding to the caloric content of the dressing. Essentially, the kaolin causes the dressing to retain its viscosity, i.e., prevents it from thinning out. Less than the amount specified renders it ineffective whereas if the amount is increased the product becomes pasty and unpalatable.

The above referred to ingredients in the critical ranges above set forth, and water, when blended in accordance with the method of the instant invention, produce a carrier of oleaginous characteristics which gives the dressing body, coherence and the oily effect whereby it will cling to the salad ingredients, and which also creates the anticipated effect on the palate. Moreover, they constitute a highly effective carrier for the other ingredients of the dressing. The unique carrier holds all of the ingredients together and prevents separation. Moreover, it does not interfere with the taste effect of the other ingredients and permits the taste of the dressing to be varied by changing the relative amounts of said ingredients. Still further, the carrier provided herein gives the final product a long shelf life. Indeed, the present salad dressing does not even have to be shaken before use as is the case with ordinary French dressing in which the oil separates from the other ingredients.

Conventional tomato paste including 27 to 30% total solids, vacuum concentrated, is employed to enhance flavor, create body and give color. It is used in an amount comprising approximately 3% by weight of the dressing. Generally, less than 3% produces no flavor effect whereas more than 3% adds too much to the caloric content.

Vinegar (5% acidity) is another ingredient and is used in the range of 5 to 30% by weight, the preferred amount being 25%. Desirably, vinegar obtained from fermented cider is employed. The vinegar is an acidifying agent and its purpose is to add flavor and to serve as a preservative. If less than 5% is employed, the preserving action fails, and when vinegar is present in amounts exceeding 30%, the product is inedible. In place of cider vinegar, citric acid, distilled vinegar, malt vinegar or wine vinegar can be employed, the range being the same as that for cider vinegar.

Other conventional ingredients are added for flavoring purposes, and the amounts of each are governed by the flavor desired. The following is an example of a dressing embodying the present invention:

| Ingredients | Percentage by Weight |
| --- | --- |
| Gum Tragacanth | 1.5 |
| Agar | 0.2 |
| Pectin | 0.2 |
| Kaolin | 1 |
| Tomato paste (27 to 30% total solids, vacuum concentrated) | 3.0 |
| Salt (NaCl) | 4.75 |
| Vinegar (from fermented cider) 5% acidity | 25 |
| Saccharin | 0.06 |
| Onion powder or juice | |
| Garlic powder or juice | |
| Pepper | 0.67 |
| Mustard | |
| Paprika | |
| FDC Yellow 5 | 0.004 (trace) |
| FDC Yellow 6 | 0.011 (trace) |
| Water—q.s. 100%. | |

Saccharin is used as a low calorie synthetic sweetener as a substitute for sugar, and calcium or sodium cyclamate also can be used as a substitute. In addition to the spices listed in the example, any other spices used in salad dressings of the character described can be employed, the amounts being variable in accordance with the taste desired. The yellow coloring simply is employed to simulate the color most popular with regular French dressings and comprises Federally certified colors which are approved for use in foods.

A study of the above example immediately will reveal why the dressing produced in accordance with the present invention has such a low caloric content. Substantially more than one-half of said dressing by weight exclusive of vinegar comprises water as opposed to less than 5% water by weight exclusive of vinegar in a regular French dressing. And as already mentioned there is no oil at all in the instant salad dressing.

Pursuant to the present invention, a method of producing the above-described salad dressing is provided. Said method includes the following steps: All of the powdered materials except salt and agar are mixed in a ribbon or tumbler type blender until an intimate mixture is produced. Ordinarily, this takes 15 to 20 minutes. All of the solid ingredients of the carrier are powders; the other powdered materials include the sugar substitute and the various spices and flavors. Next, the tomato paste is added to four-fifths of the water which is to be used in the dressing and agitated for 5 minutes in any conventional manner as by a rapid propeller-type agitator. The blended powder mix is added to the mixture of water and tomato paste and is agitated until all the lumps are broken up. This ordinarily takes about 10 minutes. The salt then is added and the solution agitated for 10 minutes. A hot solution of agar produced by boiling the remaining water and dissolving the agar therein by agitation and rapid boiling is added to the mixture of water, tomato paste, salt and powders and mixed in by agitation. Next, vinegar is added and the entire mixture agitated for 10 minutes. The solution is homogenized as by running the same through a homogenizer, chemicolloid mill or any other device commonly used for producing emulsions, after which it is ready for filling. All of the steps set forth, except of course where boiling specifically is mentioned, are carried out at ambient temperatures.

The order of steps is highly important in obtaining a salad dressing meeting the requirements set forth herein.

The viscosity of a product made in accordance with the present invention is in the range of 65 to 90 c.p.s. measured with a Brookfield viscometer using a No. 4 spindle at 6 r.p.m. at 25° C.

It thus will be seen that there is provided a dressing and method for making the same which achieve the several objects of the present invention and are well adapted to meet the conditions of practical use.

As various possible embodiments might be made of the above invention, and as various changes might be made in the embodiment above set forth, it is to be understood that all matter herein described is to be interpreted as illustrative and not in a limiting sense.

Having thus described the invention, there is claimed as new and desired to be secured by Letters Patent:

1. In a French dressing, an aqueous carrier of low caloric content having oleaginous characteristics and essentially comprising a gum selected from the group consisting of gum tragacanth, gum karaya, methyl cellulose, propylene glycol sodium alginate and karaghinates, a gum selected from the group consisting of agar gum and derivatives thereof, a gum selected from the group consisting of pectin and derivatives thereof, kaolin, and a predominant amount of water, the first of said gums being present in an amount ranging from 1.2 to 1.5% by weight of the dressing, the second of said gums being present in an amount ranging from 0.2 to 0.35% by weight of the dressing, the third of said gums being present in an amount ranging from 0.2 to 0.5% by weight of the dressing and kaolin being present in the amount of 1% by weight of the dressing.

2. A low calorie French dressing free from oil, comprising 1.3% by weight gum tragacanth, 0.2% by weight agar, 0.2% by weight pectin, 1% by weight kaolin, 3% by weight tomato paste including 27 to 30% total solids, 4.75% by weight sodium chloride, 25% by weight cider vinegar of 5% acidity, 0.06% by weight saccharin, spices, coloring, and the balance water.

References Cited in the file of this patent

UNITED STATES PATENTS

| | | |
|---|---|---|
| 2,131,064 | Musher | Sept. 27, 1938 |
| 2,162,609 | Coleman | June 13, 1939 |
| 2,170,518 | Musher | Aug. 22, 1939 |
| 2,217,699 | Musher | Oct. 15, 1940 |
| 2,344,688 | Folkrod | Mar. 21, 1944 |
| 2,629,665 | Gordon | Feb. 24, 1953 |
| 2,712,997 | Cooley | July 12, 1955 |